C. SELLMAN.
Sky-Light Bars.

No. 140,650. Patented July 8, 1873.

Witnesses:
E. Wolff

Inventor:
C. Sellman
Per
Attorneys.

UNITED STATES PATENT OFFICE.

CHARLES SELLMAN, OF NEW YORK, N. Y.

IMPROVEMENT IN SKY-LIGHT BARS.

Specification forming part of Letters Patent No. 140,650, dated July 8, 1873; application filed May 26, 1873.

*To all whom it may concern:*

Figure 1:
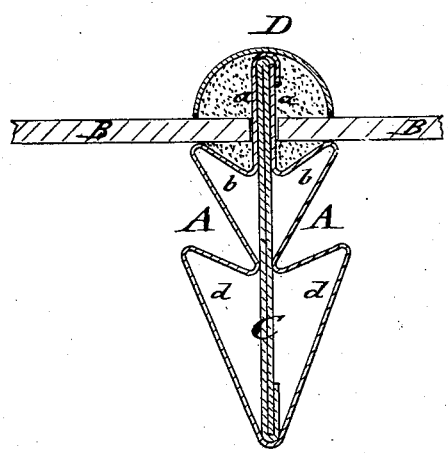
Figure 2:
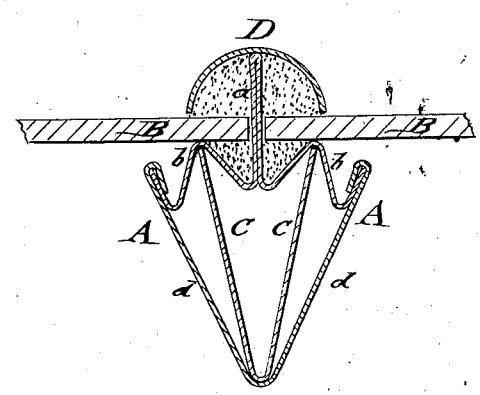

Be it known that I, CHARLES SELLMAN, of the city of New York, in the county and State of New York, have invented a new and useful Improvement in Sky-Light Bars, of which the following is a specification:

In the accompanying drawing, Figure 1 represents a vertical transverse section of my sky-light bar for large and heavy sky-lights, and Fig. 2 is a vertical transverse section of a modification of the same, to be used for lighter sky-lights.

Similar letters of reference indicate corresponding parts.

My invention is an improvement in the class of sky-light bars formed hollow or of sheet metal; and consists in forming the bar with a central vertically-projecting part, inclined side supports for the glass panes, and inclined gutters, as herein described.

In the drawing, A represents the main supporting-piece, of suitable metal, formed of one continuous sheet, in two symmetrical halves, joined at the top part. It consists of three parts, the upper, $a\ a$, being straight and parallel with each other; then the V-shaped parts $b$, inclining under an oblique angle toward the part $a$; and, lastly, the lower and somewhat wider parts $d$, of similar shape and inclination. The glass plates B rest on the edges of parts $b$, being placed up to parts $a$; and the space between them and the inclined parts is filled up with putty or similar material. The lower inclination of parts $d$ forms the troughs or gutters for the water condensing on the inside of the glass plates, which is conducted off by suitable means. The support A is strengthened by the stiffening-piece C, which is placed vertically between the symmetrical halves of support A. It extends through the whole length of support A, and may be made of one, two, or more layers of sheet metal, according to the weight to be supported. The semicircular top capping D rests on the upper parts $a$ of support A, projecting between the glass plates B and sidewise on the glass, and is placed over the putty, which is laid profusely over the joint of the plates B and parts $a$, so that it completely fills the space between said parts and capping D. The superfluous putty or cement is pressed to the outside of the capping D when the same is laid on, and may be scraped together for further use.

The compact combination of the putty above and below the glass secures a joint which is impermeable to water, and rapidly and easily laid by the workman.

The long and narrow shape of the bar is favorable to the admission of the light—more so than the bars with projecting gutters and parts.

The modification shown in Fig. 2 is designed for lighter structures, the main support A being bent of one or two pieces, the gutter part $d$ projecting sidewise instead of approaching toward the central axis.

A V-shaped movable stiffening, C, may be inserted, in case the weight placed on the bar may require it.

The whole bar is produced and put up in less time and at less expense than any hitherto in use.

Having thus described my invention, I claim as new and desire to secure by Letters Patent—

The main supporting-bar A, bent of symmetrical shape to form an upward-projecting part, $a$, inclined supports $b$, and inclined gutters $d$, substantially as described.

CHARLES SELLMAN.

Witnesses:
PAUL GOEPEL,
T. B. MOSHER.